United States Patent
Nakamura et al.

(10) Patent No.: US 9,070,925 B2
(45) Date of Patent: Jun. 30, 2015

(54) BATTERY CHARGER AND BATTERY CHARGER ATTACHING STRUCTURE

(75) Inventors: Masanori Nakamura, Wako (JP); Ryo Sato, Wako (JP); Hiroshi Iwakami, Wako (JP); Atsuro Takeno, Wako (JP); Yoshitaka Kubota, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 606 days.

(21) Appl. No.: 13/393,530

(22) PCT Filed: Sep. 15, 2009

(86) PCT No.: PCT/JP2009/066112
§ 371 (c)(1),
(2), (4) Date: Feb. 29, 2012

(87) PCT Pub. No.: WO2011/024326
PCT Pub. Date: Mar. 3, 2011

(65) Prior Publication Data
US 2012/0176086 A1    Jul. 12, 2012

(30) Foreign Application Priority Data
Aug. 31, 2009   (WO) .................. PCT/JP2009/065220

(51) Int. Cl.
*H01M 10/46* (2006.01)
*H01M 2/10* (2006.01)
(Continued)

(52) U.S. Cl.
CPC .............. *H01M 2/1072* (2013.01); *B62J 11/00* (2013.01); *B62K 11/10* (2013.01); *B62K 19/30* (2013.01);
(Continued)

(58) Field of Classification Search
CPC ..... H02J 7/0042; H02J 7/0043; H02J 7/0045; Y02T 10/7005; Y02T 10/7088
USPC .......... 320/104, 109, 111, 115; 180/220, 216, 180/65.1, 68.5
See application file for complete search history.

(56) References Cited

U.S. PATENT DOCUMENTS 4,557,345 A * 12/1985 Hamane et al. ............... 180/229
4,799,568 A *  1/1989 Tanaka ........................ 180/219
(Continued)

FOREIGN PATENT DOCUMENTS

JP    1-143253 U   10/1989
JP    02-104567 U  8/1990
(Continued)

OTHER PUBLICATIONS

Japanese Office Action for corresponding JP Application No. 2013-130798, Apr. 15, 2014, w/ English translation of Examiner's Statement.
(Continued)

*Primary Examiner* — Edward Tso
(74) *Attorney, Agent, or Firm* — Mori & Ward, LLP

(57) ABSTRACT

Provided are a battery charger, which is a different body from a vehicle and the durability, performance, etc., of which are maintained, and a battery charger attaching structure. The battery charger attaching structure comprises: a battery; a battery charger being a different body from a vehicle and charging the battery; an electric motor for generating driving force on the basis of the power supplied from the battery; vehicle covers for covering the vehicle; and an attachment portion provided on the vehicle covers and used for attaching the battery charger on the side of the vehicle. The attachment portion is provided at an upper part on a leg shield.

7 Claims, 14 Drawing Sheets

(51) Int. Cl.
  *B62J 11/00* (2006.01)
  *B62K 11/10* (2006.01)
  *B62K 19/30* (2006.01)

(52) U.S. Cl.
  CPC ......... *B62K 2202/00* (2013.01); *B62K 2204/00* (2013.01); *B62K 2208/00* (2013.01); *H01M 10/46* (2013.01)

(56) References Cited

U.S. PATENT DOCUMENTS

| | | | | |
|---|---|---|---|---|
| 6,578,653 | B2 * | 6/2003 | Nagai | 180/230 |
| 6,722,460 | B2 * | 4/2004 | Yang et al. | 180/220 |
| 8,662,232 | B2 * | 3/2014 | Nakamura et al. | 180/220 |

FOREIGN PATENT DOCUMENTS

| | | |
|---|---|---|
| JP | 3055706 | 9/1992 |
| JP | 06-227465 | 8/1994 |
| JP | 07-237572 | 9/1995 |
| JP | 07-277249 | 10/1995 |
| JP | 09-164989 | 6/1997 |
| JP | 10-334881 | 12/1998 |
| JP | 2004-079320 | 3/2004 |
| JP | 2004-230956 | 8/2004 |
| JP | 2009-159814 | 7/2009 |
| TW | M315891 U | 7/2007 |
| TW | 354530 | 4/2009 |

OTHER PUBLICATIONS

Taiwanese Office Action for corresponding TW Application No. 099129064, Mar. 29, 2013.
International Search Report for corresponding International Application No. PCT/JP2009/066112, Dec. 28, 2009.
Written Opinion for corresponding International Application No. PCT/JP2009/066112, Dec. 28, 2009.
Written Opinion of International Preliminary Examining Authority for corresponding International Application No. PCT/JP2009/066112, Aug. 2, 2011.
Taiwanese Office Action for corresponding TW Application No. 099129064, Nov. 27, 2013 (w/ English translation of pertinent portion).

* cited by examiner

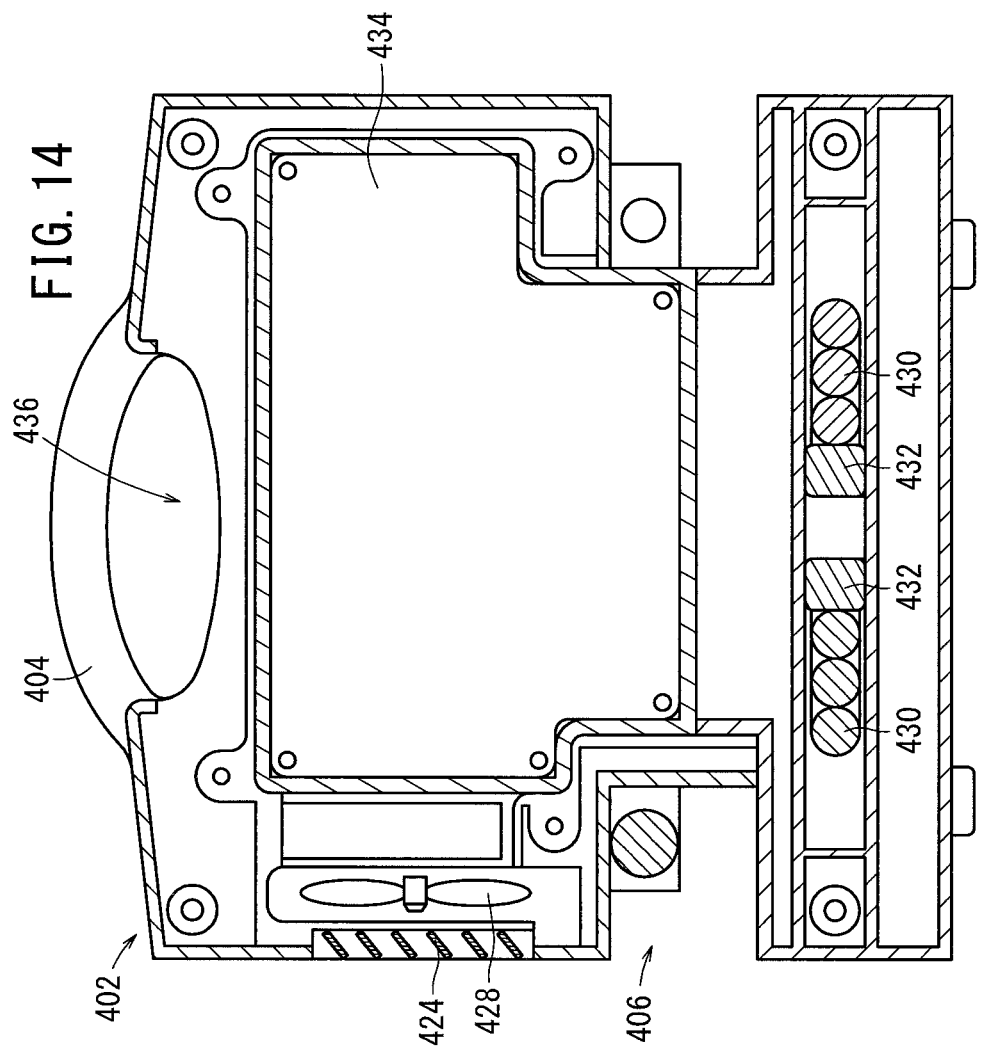

US 9,070,925 B2

BATTERY CHARGER AND BATTERY CHARGER ATTACHING STRUCTURE

TECHNICAL FIELD

The present invention relates to an electric charger (battery charger) and a mounting structure for an electric charger (battery charger attaching structure), and more particularly to an electric charger mounting structure for maintaining the durability, performance, etc. of an electric charger that is separate from a vehicle which incorporates the electric charger therein.

BACKGROUND ART

There has heretofore been available a technology wherein an electric charger for charging the battery of a two-wheeled electric vehicle is disposed below the rider's seat of the vehicle (Japanese Patent No. 3055706).

According to another available technology, an electric charger has an appearance jointly provided by a storage unit and a cover, and an AC cord and a DC cord are wound in a recess that is defined by the storage unit and the cover (Japanese Laid-Open Patent Publication No. 2004-079320).

SUMMARY OF INVENTION

According to the technology disclosed in Japanese Patent No. 3055706, the vehicle has a large weight and a low mileage because it moves while carrying the electric charger. Therefore, the electric charger should preferably be separate from the vehicle. When the battery on the vehicle is to be charged by the separate electric charger, the user often places the electric charger on the road. If the road is wet, for example, durability and performance of the electric charger tends to be lowered. If the vehicle is a scooter-type two-wheeled electric vehicle, then the electric charger may be placed on the step floor thereof when it charges the battery on the two-wheeled electric vehicle. If at this time the two-wheeled electric vehicle is supported on its side stand, then the two-wheeled electric vehicle is inclined to the vertical. Accordingly, it is desirable for the two-wheeled electric vehicle to have a structure by which the electric charger can be firmly secured to the step floor.

If the electric charger that is separate from the vehicle is used, it is necessary to store the electric cord of the electric charger in order to prevent the electric cord from being deteriorated in quality. Though the technology disclosed in Japanese Laid-Open Patent Publication No. 2004-079320 allows the electric cord to be stored, it discloses nothing about the storage of a plug or the like that is connected to an end of the electric cord. When the electric charger is placed in a storage box and carried around, the plug may possibly interfere with other objects stored in the storage box.

It is an object of the present invention to provide an electric charger which is separate from a vehicle and a mounting structure for such an electric charger, which make it possible to keep the durability and performance of the electric charger.

To achieve the above object, there is provided, in an embodiment of the present invention, a mounting structure for installing an electric charger on a vehicle (10) including a battery (18), an electric motor (16) for generating propulsive force to move the vehicle (10) based on electric power supplied from the battery (18), and a vehicle frame cover (12, 54, 55, 62) which covers the vehicle (10), wherein the electric charger (200) charges the battery (18) and is separate from the vehicle (10), the mounting structure comprising a mount (96) disposed on the vehicle frame cover, for installing the electric charger (200) on the vehicle (10). According to such an embodiment, since the electric charger is kept out of contact with the road while it is charging the battery, the durability and performance of the electric charger are maintained. The electric charger is firmly secured to the vehicle.

According to an embodiment of the present invention, in the mounting structure for installing an electric charger, the mount (96) is disposed on an upper portion of a leg shield (55). According to such an embodiment, the user of the electric charger is not required to bend over and hence does not have to change its posture when installing the electric charger on the vehicle.

According to an embodiment of the present invention, in the mounting structure for installing an electric charger, the mount (96) is disposed on a step floor (12). According to such an embodiment, since the electric charger is kept out of contact with the road while it is charging the battery, the durability and performance of the electric charger are maintained. The electric charger is firmly secured to the vehicle.

According to an embodiment of the present invention, in the mounting structure for installing an electric charger, the mount (96) is disposed on a lower portion of a seat cover (62). According to such an embodiment, the electric charger is prevented from being wetted by rainwater.

According to an embodiment of the present invention, in the mounting structure for installing an electric charger, the vehicle (10) includes a charging connector (20) for charging the battery (18), an electric charger (200) having an electric charging cord (203) to be connected to the charging connector (20). According to such an embodiment, the electric charger and the electric charging cord are prevented from contacting the road.

According to an embodiment of the present invention, in the mounting structure for installing an electric charger, the electric charging cord (203) is of such a length that the electric charging cord (203) is kept out of contact with the ground, when the electric charger (200) is installed on the mount (96). According to such an embodiment, the electric charger and the electric charging cord are prevented from contacting the road.

According to an embodiment of the present invention, in the mounting structure for installing an electric charger, the charging connector (23) is oriented obliquely forwardly and outwardly as viewed from a front end of a vehicle (10). According to such an embodiment, the electric charging cord can easily be connected to the charging connector.

According to an embodiment of the present invention, in the mounting structure for installing an electric charger, the vehicle (10) includes a side stand (72), and the charging connector (20) is disposed on the same side of the vehicle (10) as the side stand (72). According to such an embodiment, the electric charger can prevent blockage of the traffic on the road while charging the battery.

According to an embodiment of the present invention, in the mounting structure for installing an electric charger, the vehicle (10) includes a seat cover (62) having a charging lid (74) on a side surface of a vehicle, and the charging connector (20) is disposed behind the charging lid (74). According to such an embodiment, the electric charging cord is prevented from being wetted by rainwater.

To achieve the above object, there is provided, in accordance with an embodiment of the present invention, an electric charger (400) comprising a storage case (402) housing a charger unit (434) therein, a take-up recess (406) defined in an outer circumferential surface of the storage case (402), a first charging electric cord (408) connected to the charger unit (434) being wound around the take-up recess (406), and a plug cavity (416) defined in the storage case (402) for receiving therein a plug (412) connected to a distal end of the first charging electric cord (408). According to such an embodiment, the electric charger with the first charging electric cord wound in the take-up recess has a neat and smart appearance and makes itself compact. As the plug is housed in the plug cavity, the plug does not interfere with other objects stored in a storage box in which the electric charger is placed when the user carries the storage box.

According to an embodiment of the present invention, in the electric charger (400), the plug cavity (416) is disposed at a position corresponding to a position of the plug (412) at a time when winding of the first charging electric cord (408) around the storage case (402) is finished. According to such an embodiment, the electric charger with the first charging electric cord being wound up is rendered more compact.

According to an embodiment of the present invention, the electric charger (400) further comprises a magnet (418, 420) disposed in at least one of the plug (412) and the plug cavity (416). According to such an embodiment, the plug is easily secured in place.

According to an embodiment of the present invention, in the electric charger (400), the plug (412) is angularly movable with respect to the first charging electric cord (408). According to such an embodiment, the plug can be conveniently placed in the plug cavity when the first charging electric cord is placed in the take-up recess, and the electric charger with the first charging electric cord wound in the take-up recess has a neater and smarter appearance.

According to an embodiment of the present invention, the electric charger (400) further comprises a cooling far. (428) for cooling the charger unit (434), the cooling fan (428) being disposed in the storage case (402) above the take-up recess (406). According to such an embodiment, the cooling fan can easily be positioned when it is to be installed.

According to an embodiment of the present invention, the electric charger (400), further comprises a spool (432) disposed in the storage case (402), and a second charging electric cord (430) which is wound around the spool (432), wherein the spool (432) is disposed below the take-up recess (406). According to such an embodiment, the space available in the storage case is efficiently utilized.

BRIEF DESCRIPTION OF DRAWINGS

FIG. 14 is a cross-sectional view taken along line XIV-XIV of FIG. 9.

DESCRIPTION OF EMBODIMENTS

Electric chargers and mounting structures therefor according to preferred embodiments of the present invention will be described in detail below with reference to the accompanying drawings.

<1st Embodiment>

Figure 1:
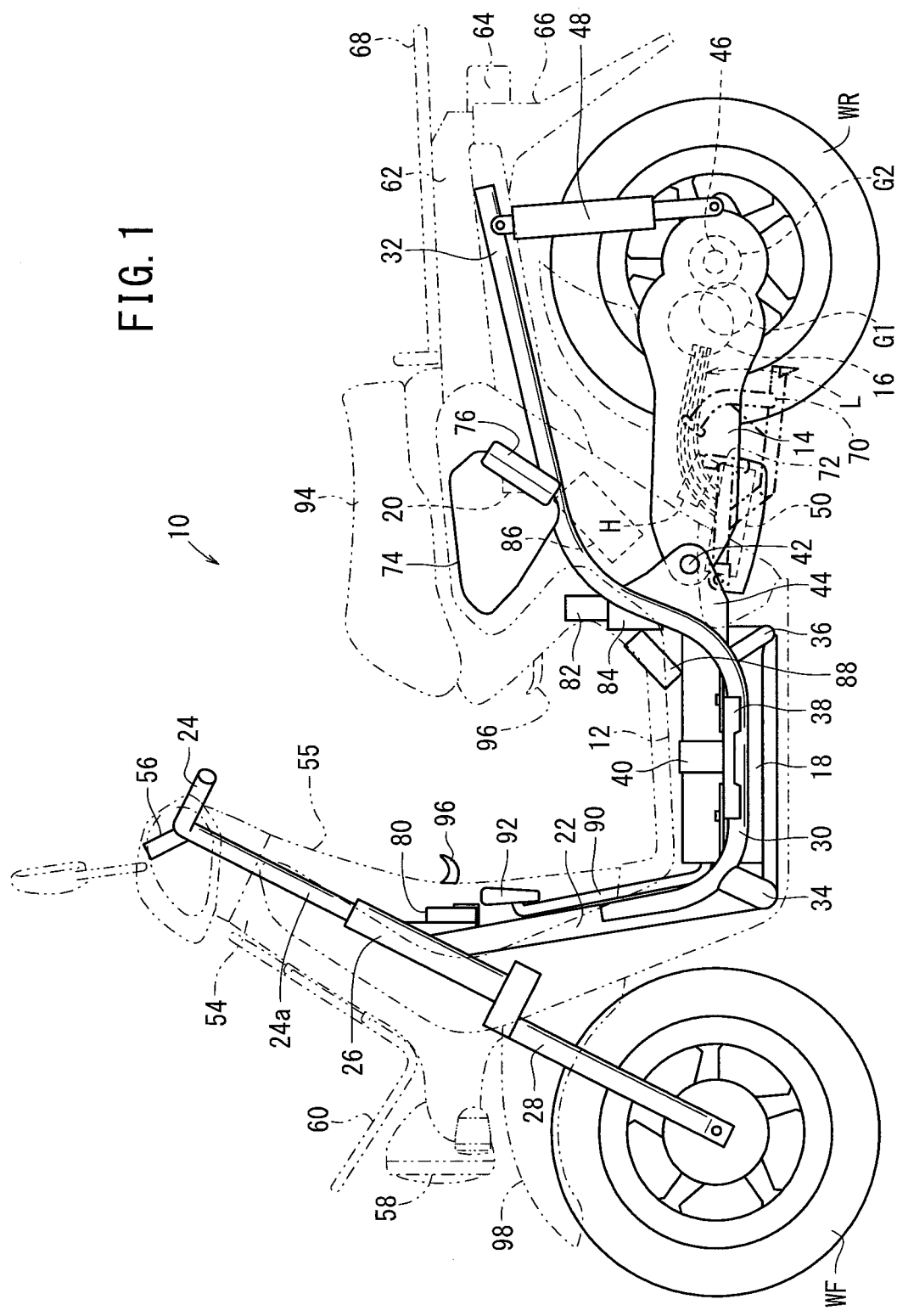
FIG. 1 is a side elevational view showing major structural details of a two-wheeled electric vehicle 10 according to a first embodiment of the present invention.
Figure 2:
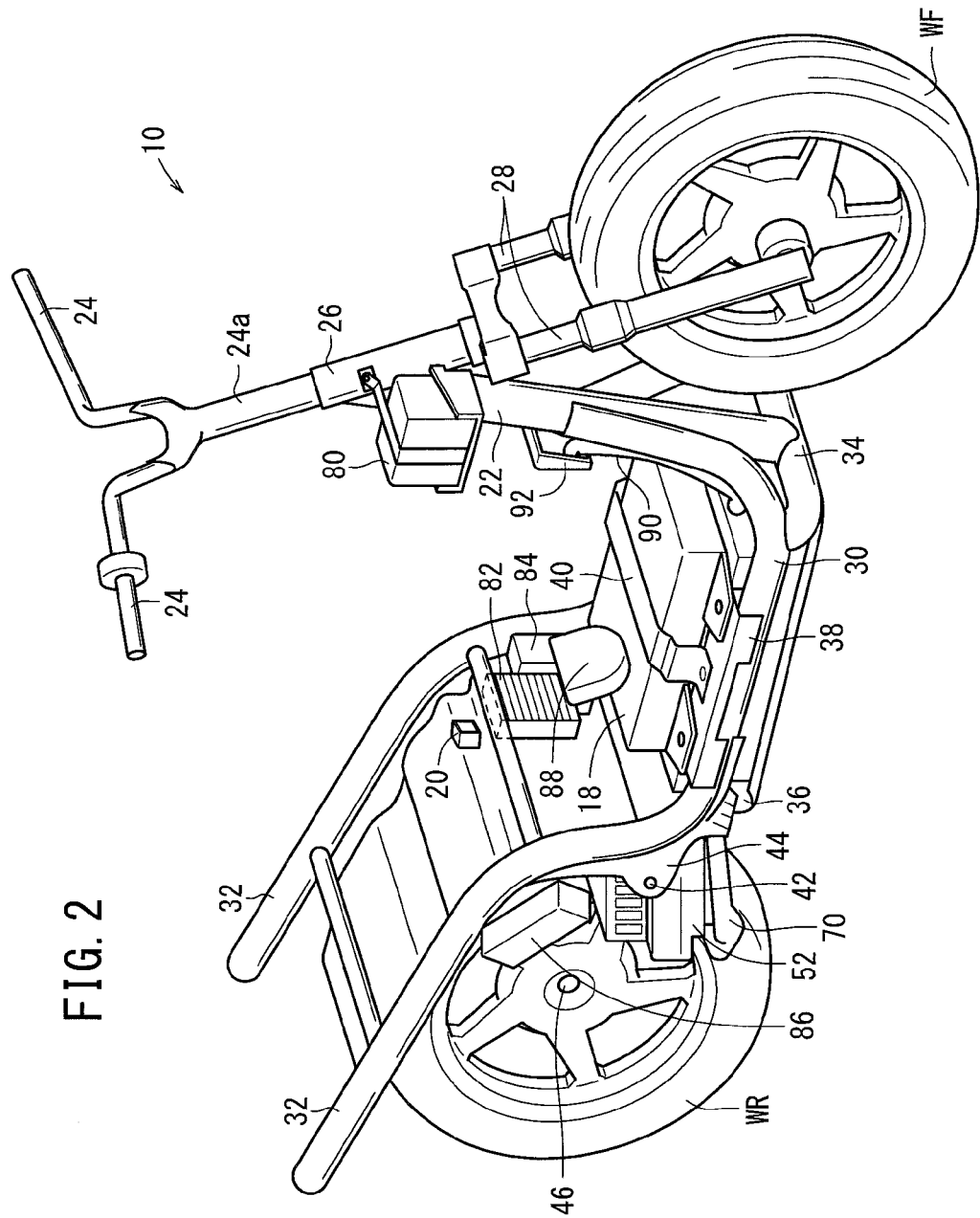
FIG. 2 is a perspective view of the two-wheeled electric vehicle 10 shown in FIG. 1 with a vehicle frame cover being removed.

FIG. 1 is a side elevational view showing major structural details of a two-wheeled electric vehicle 10 according to a first embodiment of the present invention, and FIG. 2 is a perspective view of the two-wheeled electric vehicle 10 shown in FIG. 1 with a vehicle frame cover being removed. As shown in FIGS. 1 and 2, the two-wheeled electric vehicle 10 has a step floor 12 as part of the vehicle frame cover and a swing arm 14 housing therein an electric motor 16 for generating rotational drive power to drive a rear wheel WR. The electric motor 16 is supplied with electric power from a main battery 18 disposed beneath the step floor 12. The main battery 18 is charged by an electric charger that is connected to a charging connector 20 which is disposed in a vehicle frame assembly of the two-wheeled electric vehicle 10. The vehicle frame assembly is covered with the vehicle frame cover.

The vehicle frame assembly includes a main frame 22 supporting, on its upper end, a head pipe 26 by which a steering system 24a is rotatably supported. A pair of left and right front forks 28 is connected to the lower end of the steering system 24a, and by the pair of left and right front forks 28, a front wheel WF is rotatably supported. The front wheel WF can be steered by a pair of left and right handles 24 mounted on the upper end of the steering system 24a.

The vehicle frame assembly also includes a pair of left and right side frames 30 having respective upper ends joined to a substantially vertically central portion of the main frame 22. The left and right side frames 30 include respective oblique portions extending obliquely downwardly from the upper ends thereof and respective horizontal portions bent at the lower ends of the oblique portions and extending horizontally. The main battery 18, which has a voltage of 72 V, for example, for supplying electric power to the electric motor 16 is disposed between the horizontal portions of the left and right side frames 30. The left and right side frames 30 include respective rear oblique portions bent obliquely upwardly at an end of the horizontal portions thereof and joined to respective rear frames 32 extending obliquely upwardly and rearwardly.

A lower cross front frame 34 extends between and is fixed to the front ends of the horizontal portions of the left and right side frames 30, and a lower cross rear frame 36 extends between and is fixed to the rear ends of the horizontal portions of the left and right side frames 30. The main frame 22 has a lower end joined to a horizontally central portion of the lower cross front frame 34. The main battery 18 is interposed between the lower cross front frame 34 and the lower cross rear frame 36 in a front-back direction. The main battery 18 is thus surrounded by the left and right side frames 30, the lower cross front frame 34, and the lower cross rear frame 36 and is firmly mounted on the vehicle frame assembly.

Side brackets 38, each channel-shaped, are mounted respectively on the side frames 30 and on respective sides of the main battery 18. A strap plate 40 is attached at its ends to the side brackets 38 transversely across the main battery 18 and fastens the main battery 18 with respect to the side frames 30.

Pivot plates 44 with respective swing arm pivots 42 formed therein are attached to the rear sides of the rear oblique portions of the left and right side frames 30. The swing arm 14 is swingably supported at its front end by the swing arm pivots 42. The swing arm 14 is of a cantilevered structure, in which only an arm on the left side in the transverse direction of the vehicle supports the rear wheel WR. The rear wheel WR is rotatably supported on a rear end portion of the swing arm 14 by an axle 46. The rear end of the swing arm 14 is suspended from the left one of the rear frames 32 by a rear shock unit 48.

A power drive unit 50 which is housed in a cover member 52 is supported on a lower portion of the swing arm 14. The power drive unit 50 converts a direct current supplied from the main battery 18 into an alternating current and supplies the alternating current to the electric motor 16 via a wire harness L. The electric motor 16 transmits its power to the axle 46 and then the rear wheel WR successively through a first speed reduction gear G1 and a second speed reduction gear G2. The power drive unit 50 includes a smoothing capacitor H.

The vehicle frame cover includes a front cover 54 disposed in front of the handles 24 and which serves as part of the vehicle frame cover for covering the two-wheeled electric vehicle 10. A meter unit 56 including a speedometer, etc. is mounted on an upper portion of the front cover 54. A front headlight 58 and a front luggage carrier 60 are mounted on a front side of the front cover 54. The vehicle frame cover also includes a leg shield 55 disposed behind the head pipe 26 and contiguous to the front cover 54 and which serves as part of the vehicle frame cover for covering the two-wheeled electric vehicle 1. The leg shield 55 serves to protect the front portions of the legs of a rider who is seated on a rider's seat 94.

A front fender 98, which serves as part of the vehicle frame cover, is disposed above the front wheel WF. The step floor 12 for the rider to place its feet thereon is disposed above the main battery 18. The vehicle frame cover also includes a seat cover 62 disposed around the rear frames 32 and which serves as part of the vehicle frame cover for covering the two-wheeled electric vehicle 10. The rider's seat 94 is mounted on the seat cover 62. A tail lamp 64, a rear fender 66, and a rear luggage carrier 68 are attached to a rear end portion of the seat cover 62. The seat cover 62 has a front lower portion and a front upper portion which slightly projects upwardly in comparison to the front lower portion.

A central stand 70 having two legs that are spaced from each other in the transverse directions of the vehicle is mounted on the pivot plates 44. A side stand 72 is mounted on one of the pivot plates 44 provided at left and right sides of the two-wheeled electric vehicle 1. If the two-wheeled electric vehicle 10 is designed for use in Japan, then the side stand 72 is positioned on the left side of the vehicle frame assembly.

A charging lid 74 is openably and closably attached to the same side of the seat cover 62 as the side stand 72. The charging lid 74 can be opened and closed about a hinge 76. When the charging lid 74 is opened, the charging connector 20 is exposed. The charging connector 20 is disposed on the same side of the vehicle frame assembly as the side stand 72.

The electric charger is installed on a mount 96 which is disposed on an upper portion of the leg shield 55. Since the mount 96 is disposed on the upper portion of the leg shield 55, the user does not have to bend over and hence does not have to change its posture when installing the electric charger on the mount 96. The mount 96 may be positioned at such a height that the electric charger will not be held in contact with the step floor 12 when the electric charger is installed on the mount 96. The mount 96 is in the shape of a hook having a tip end curved and extending upwardly. The mount 96 is located in such a position that the electric charger will not be brought into contact with the road when the electric charger is installed on the mount 96.

The mount 96 may be disposed on the seat cover 62, e.g., a front side of the seat cover 62, as indicated by the two-dot-and-dash lines in FIG. 1. If the mount 96 is disposed on the front side of the seat cover 62, then since the front upper portion of the seat cover 62 hangs over the electric charger mounted on the mount 96, and thus the electric charger is not wetted while charging the main battery 18 when it is raining. The mount 96 may be disposed on the same side of the seat cover 62 as the side stand 72. In this case, since the two-wheeled electric vehicle 10 is inclined to the vertical when it is supported on the side stand 72, the two-wheeled electric vehicle 10 itself hangs over the electric charger mounted on the mount 96, thereby preventing the electric charger from being wetted while charging the main battery 18 when it is raining. The electric charger is prevented more effectively from being wetted if the mount 96 is disposed on a lower portion of the seat cover 62.

An auxiliary battery 80 having a voltage of 12 V for supplying electric power to accessories including the front headlight 58 and an ECU (Engine Control Unit) 86 is disposed on a right side of the head pipe 26 in the transverse directions of the vehicle. The auxiliary battery 80 is charged with electric power from the main battery 18. Inside the seat cover 62 and behind the main battery 18, there are disposed a DC-to-DC converter 82 for converting the voltage of 72 V from the main battery 18 into a voltage of 14.5 V and a contactor box 84 housing therein fuses, relays, etc. The ECU 86 which controls the electric motor 16 via the power drive unit 50, etc. is disposed on an outer side of the left rear frame 32 in the transverse directions of the vehicle. The auxiliary battery 80 may be dispensed with.

The main battery 18 has an opening defined in a rear portion thereof and associated with a sirocco fan 88. The main battery 18 also has an opening defined in a front portion thereof and connected to the lower end of an air intake pipe 90 which extends upwardly along the main frame 22. The air intake pipe 90 has an upper end connected to an air cleaner 92 which is disposed above the step floor 12. The air intake pipe 90 and the air cleaner 92 are housed in the front cover 54. The sirocco fan 88 is housed in the seat cover 62. The air cleaner 92 has an air inlet port defined in the leg shield 55. The air cleaner 92 introduces ambient air through the air intake pipe 90 into the main battery 18. The sirocco fan 88 discharges air out of the main battery 18 to the outside. Thus, the heat generated by the main battery 18 can be released so as to cool the main battery 18.

Figure 3:
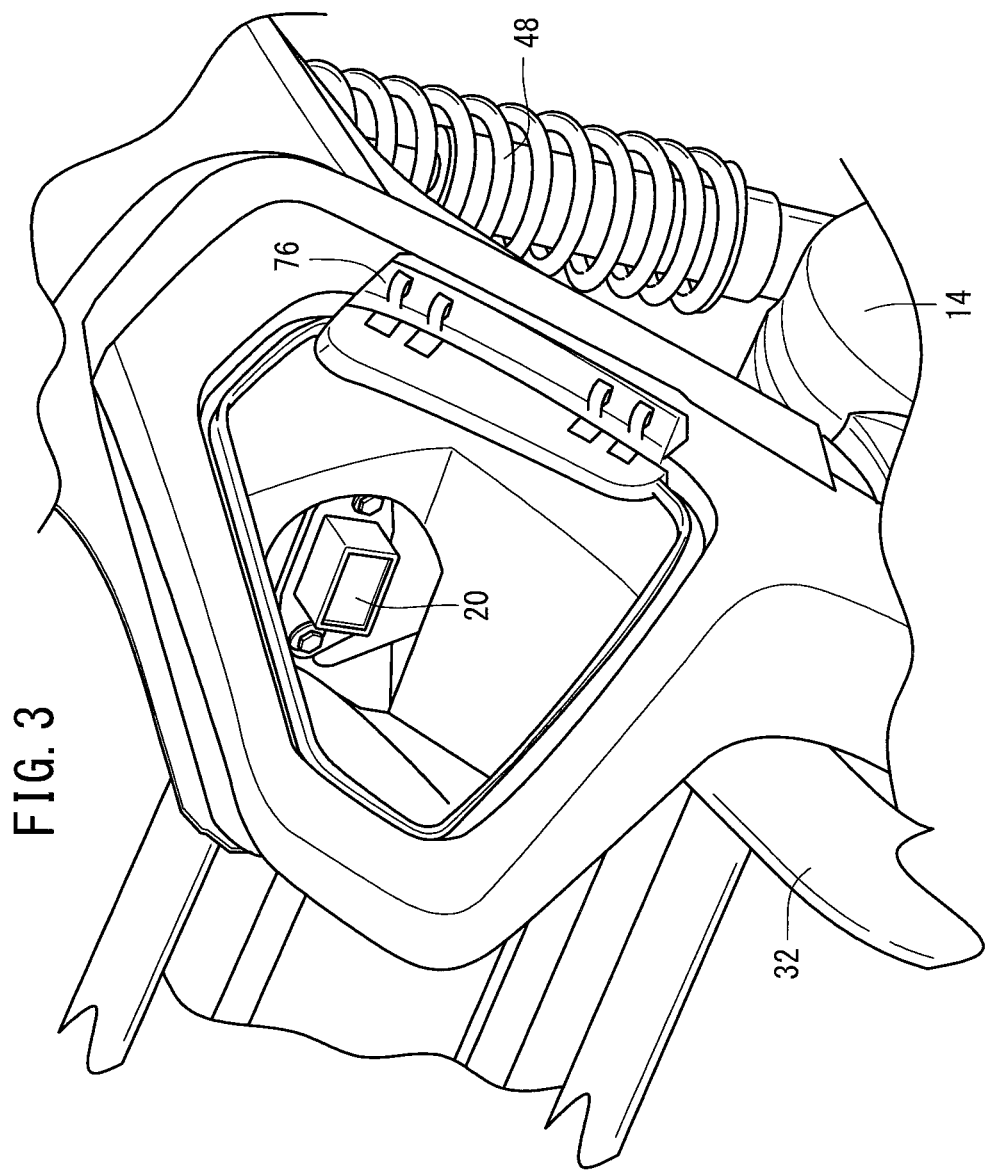
FIG. 3 is an enlarged fragmentary perspective view showing a charging connector 20 which is seen when a charging lid 74 is opened, on the two-wheeled electric vehicle 10 shown in FIG. 1.

FIG. 3 is an enlarged fragmentary perspective view showing the charging connector 20 which is seen when the charging lid 74 is opened, on the two-wheeled electric vehicle 10 shown in FIG. 1. The charging lid 74 is omitted from illustration in FIG. 3 in order to show the charging connector 20 clearly. The charging connector 20 is oriented obliquely forwardly as viewed from the front end of the two-wheeled electric vehicle 10, and is oriented outwardly of the two-wheeled electric vehicle 10. That is, the outlet of the charging connector 20 is open obliquely forwardly as viewed from the front end of the vehicle 10, and is open outwardly of the two-wheeled electric vehicle 10. The charging connector 20 is oriented outwardly of the side of the two-wheeled electric vehicle 10 where the charging lid 74 is positioned. Therefore, it is easy for the user to insert the electric charging cord of the electric charger into the charging connector 20.

As the charging lid 74 and the charging connector 20 are disposed on the same side of the two-wheeled electric vehicle 10 as the side stand 72, the main battery 18 can be charged through the charging connector 20 without blocking traffic on the road where the two-wheeled electric vehicle 10 is parked, and the user of the two-wheeled electric vehicle 10 can charge the main battery 18 safely without need to worry about any traffic accident. Furthermore, since the charging lid 74 and the charging connector 20 are disposed above the step floor 12 and below the rider's seat 94, the user can easily open and close the charging lid 74 and connect the electric charger to the charging connector 20 without bending over. The charging lid 74 and the charging connector 20 may alternatively be disposed directly below the rider's seat 94.

Figure 4:
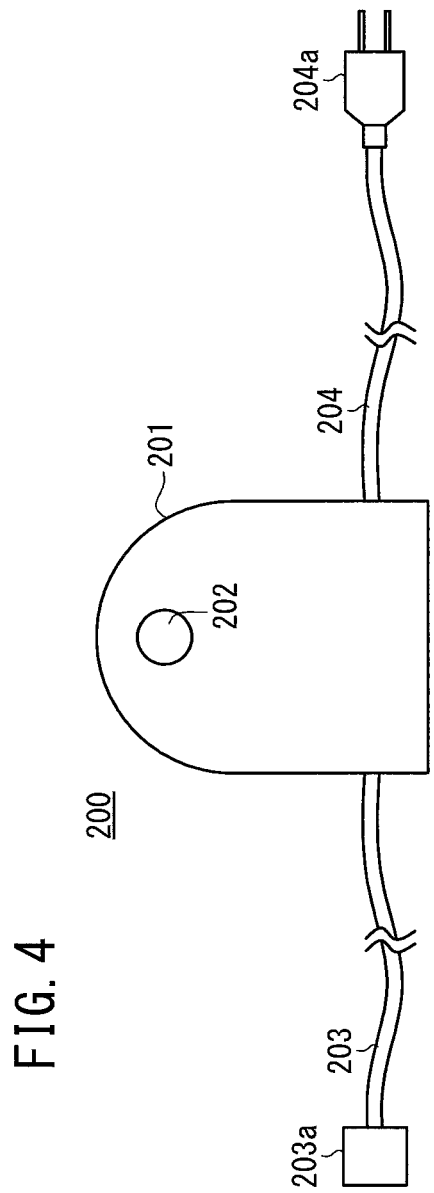
FIG. 4 is a view of an electric charger 200 according to the first embodiment of the present invention.

FIG. 4 is a view of an electric charger 200 according to the first embodiment of the present invention. As shown in FIG. 4, the electric charger 200 comprises a storage case 201 housing a charger unit therein, an electric charging cord 203, and an electric charging cord 204. The storage case 201 has an opening 202 defined in a wall thereof. When the mount 96 engages in the opening 202, the electric charger 200 is installed on the two-wheeled electric vehicle 10. The electric charging cord 203 has a connector 203a connected to its distal end and has an opposite end electrically connected to the charger unit. The electric charging cord 204 has a plug 204a connected to its distal end for connection to a commercial power supply outlet and has an opposite end electrically connected to the charger unit. The electric charger 200 also includes an AC-to-DC converter, not shown, for converting an AC voltage supplied from the commercial power supply outlet into a DC voltage required to charge the main battery 18.

Figure 5:
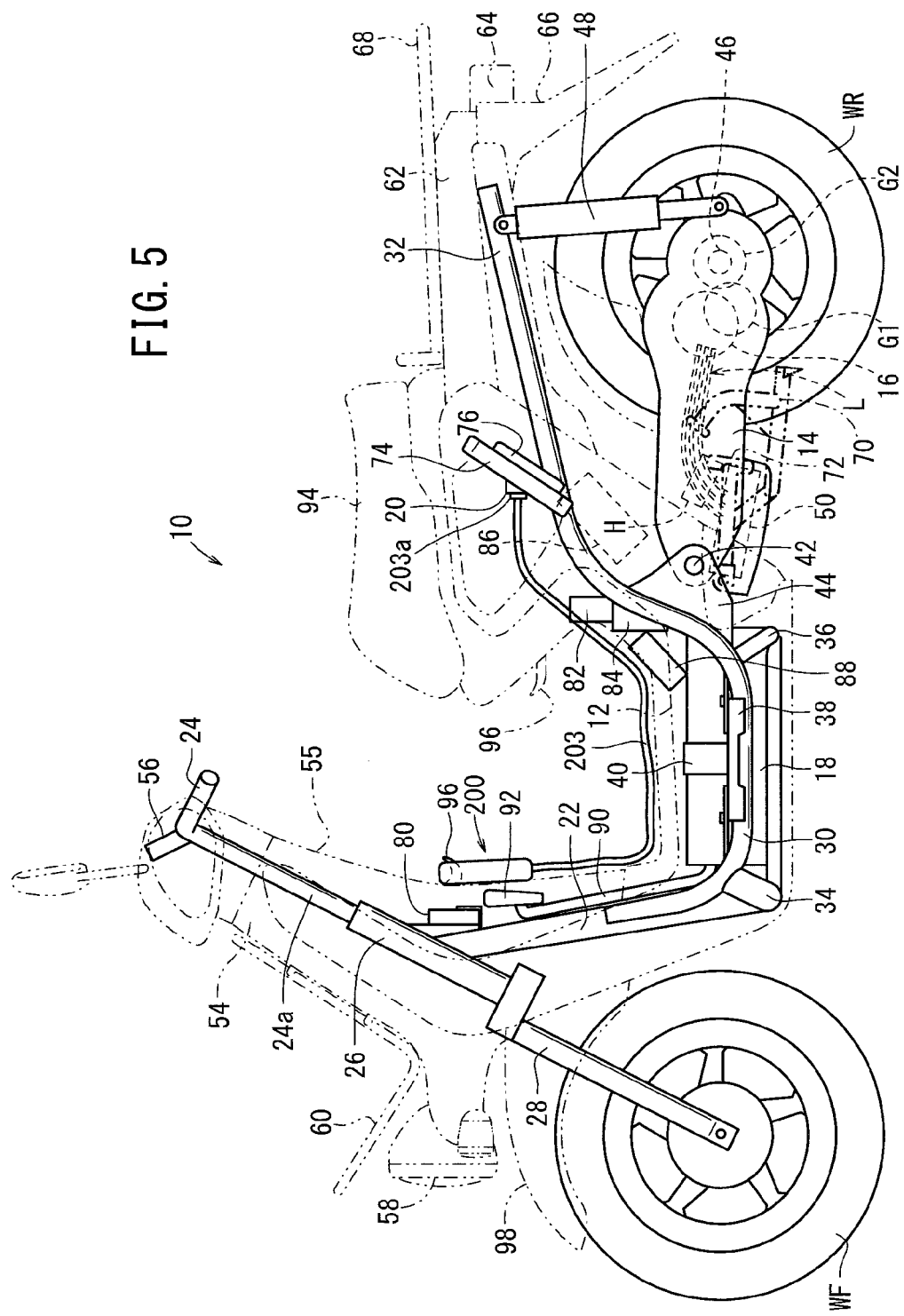
FIG. 5 is a side elevational view showing the electric charger 200 which is mounted on the two-wheeled electric vehicle 10 and has a connector 203a connected to the charging connector 20.

FIG. 5 is a side elevational view showing the electric charger 200 which is mounted on the two-wheeled electric vehicle 10 and has the connector 203a connected to the charging connector 20. When the plug 204a is inserted into the commercial power supply outlet, the electric power from the commercial power supply outlet is supplied through the electric charging cord 204 to the electric charger 200, which charges the main battery 18. The electric charging cord 203 is of such a length that it does not touch the road when the electric charger 200 is installed on the mount 96 and the connector 203a is connected to the charging connector 20. The storage case 201 stores therein the electric charging cord 204 in a take-up manner. The storage case 201 may also store therein the electric charging cord 203 in a take-up manner. Though the mount 96 is in the shape of a hook in the illustrated embodiment, it may be any of various other shapes insofar as the electric charger 200 can be installed thereon.

Figure 6:
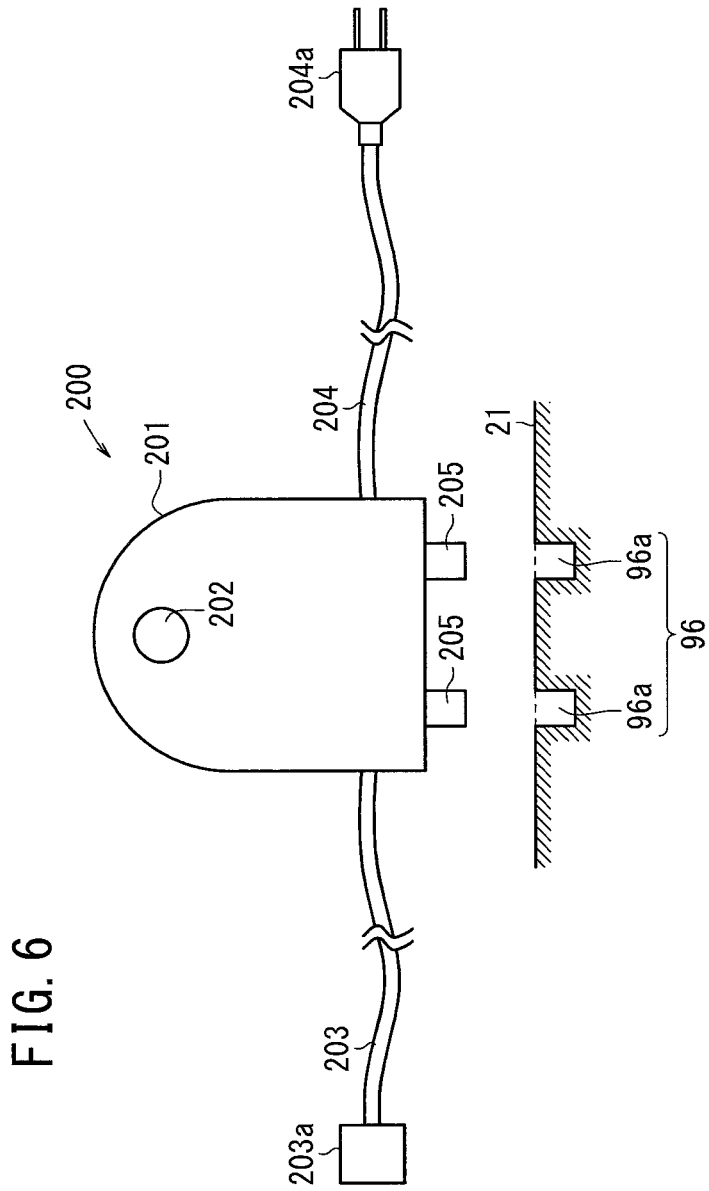
FIG. 6 is a view showing another structure of the charger mount 96.

FIG. 6 is a view showing another structure of the mount 96. In FIG. 6, the mount 96 comprises a plurality of recesses 96a defined in the step floor 12. The electric charger 200 has a plurality of teeth 205 on its bottom. When the teeth 205 are fitted respectively in the recesses 96a, the electric charger 200 is installed on the two-wheeled electric vehicle 10.

Since the mount 96 is disposed on the vehicle frame cover of the two-wheeled electric vehicle 10, the electric charger 200 is held out of contact with the road while the main battery 18 is being charged by the electric charger 200. Therefore, durability and performance of the electric charger 200 can be maintained. As the electric charger 200 is securely installed on the mount 96, the electric charger 200 does not fall off during its usage and is prevented from being broken or damaged. The electric charger 200 shown in FIG. 6 may be free of the opening 202.

Figure 7:
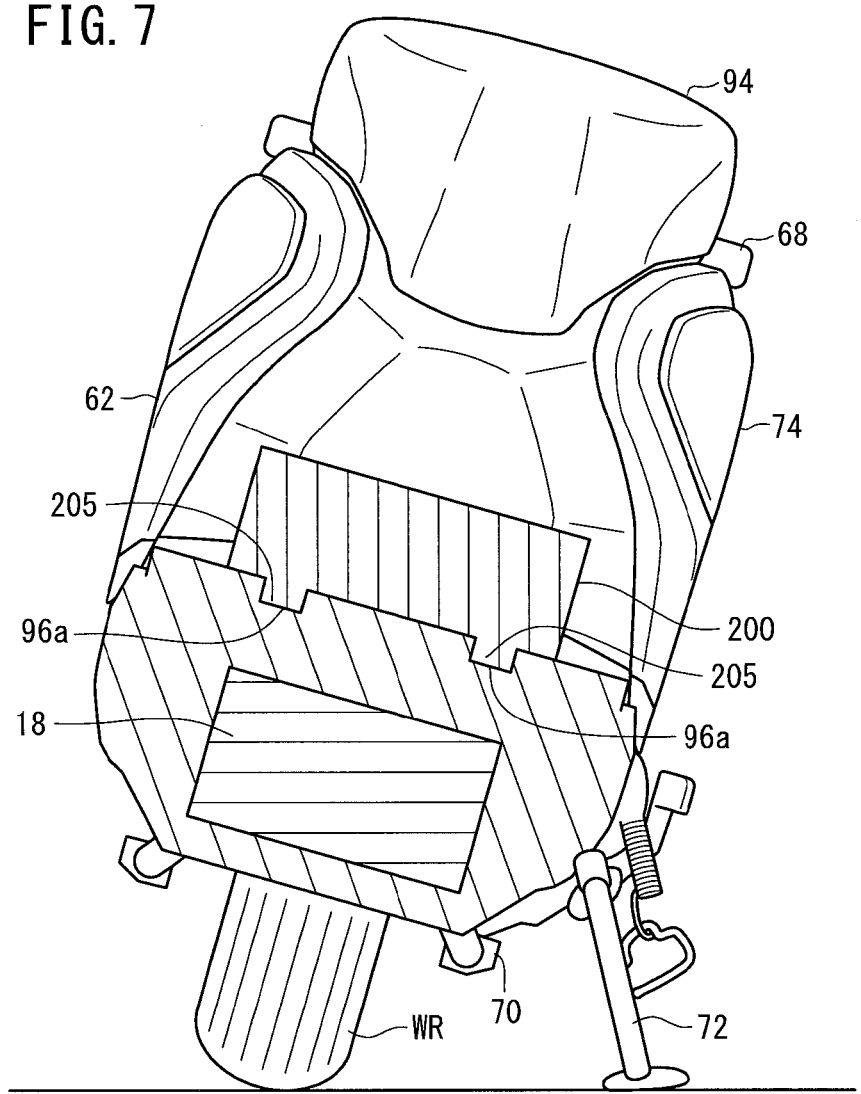
FIG. 7 is a transverse cross-sectional view of the two-wheeled electric vehicle 10 with the electric charger 200 installed on the charger mount 96.

FIG. 7 is a transverse cross-sectional view of the two-wheeled electric vehicle 10 with the electric charger 200 installed on the mount 96, the view being taken along a line extending across the step floor 12. The mount 96 has a plurality of recesses 96a defined in the step floor 12 which are spaced from each other in the transverse directions of the vehicle. The electric charger 200 has a plurality of teeth 205 on its lower surface which is of the largest surface area thereof. In other words, the teeth 205 are disposed on the surface of the electric charger 200 which is held in contact with the step floor 12 when the electric charger 200 lies on the step floor 12. As described above, the recesses 96a in which the teeth 205 of the electric charger 200 are fitted respectively, are provided as the mount 96, the recesses 96a being defined in the step floor 12 and being spaced from each other in the transverse directions of the vehicle 10. Thus, the electric charger 200 is firmly held on the two-wheeled electric vehicle 10 even when the two-wheeled electric vehicle 10 is supported on the side stand 72 while being inclined to the vertical as shown in FIG. 7.

Figure 8:
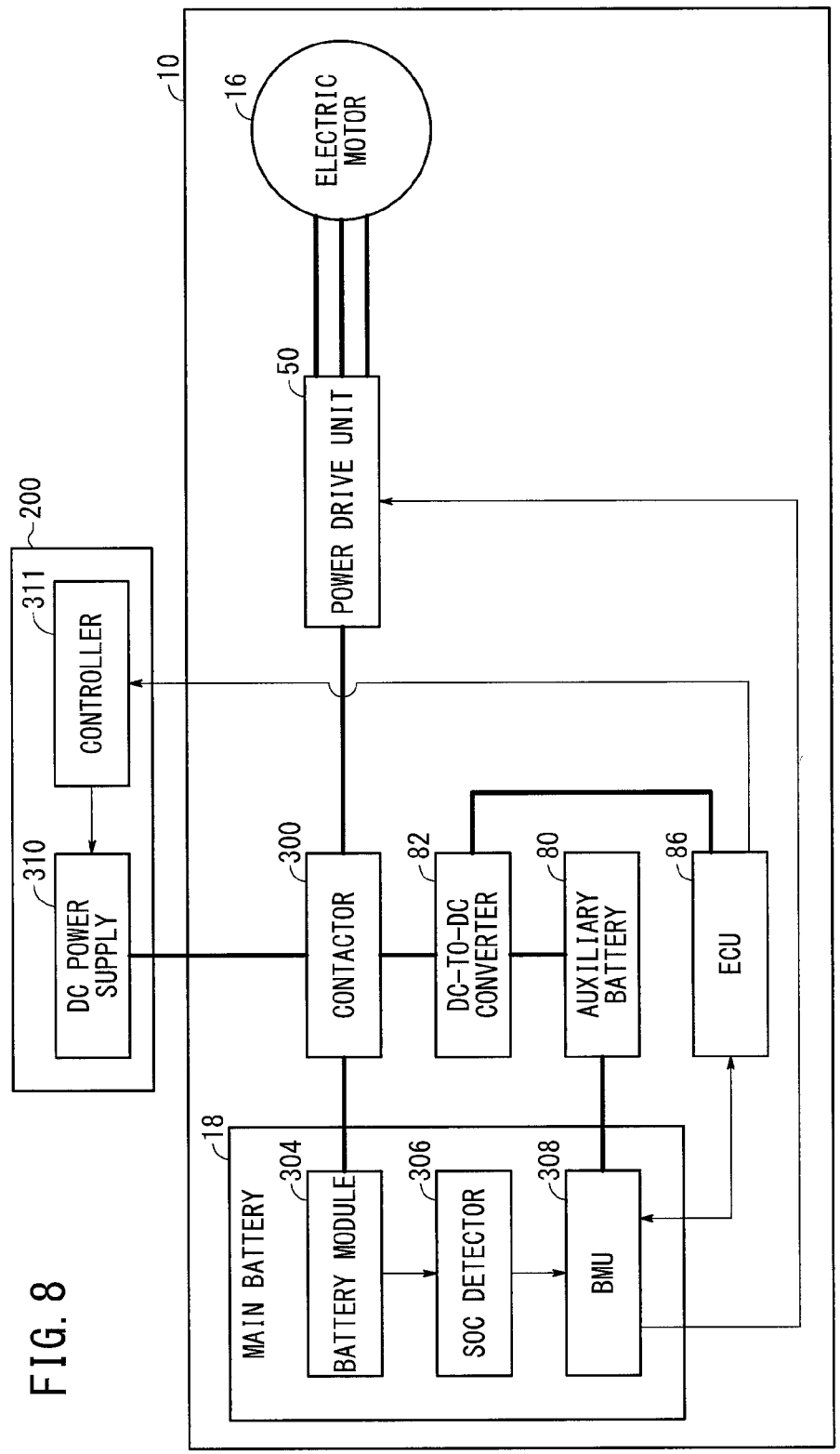
FIG. 8 is a block diagram of an electric system of the two-wheeled electric vehicle 10.

FIG. 8 is a block diagram of an electric system of the two-wheeled electric vehicle 10. Reference numerals shown in FIG. 8 which are identical to those shown in FIGS. 1 through 4 denote identical or equivalent parts. The two-wheeled electric vehicle 10 includes the main battery 18, the DC-to-DC converter 82, the auxiliary battery 80, the electric motor 16, the ECU 86, the power drive unit 50, and a contactor 300. The electric charger 200 comprises a DC power supply 310 and a controller 311. In FIG. 8, thick solid lines represent the flow of electric power, and thin solid lines represent the flow of signals.

The main battery 18 comprises a battery module 304, an SOC detector 306, and a BMU (Battery Management Unit) 308. The battery module 304 is made up of a plurality of battery cells. The SOC detector 306 detects the SOC (State Of Charge) of each of the battery cells. The SOC detector 306 has a shunt resistor and detects the SOC of each battery cell by detecting an electric current discharged from the battery cell and an electric current supplied to charge the battery cell. Alternatively, the SOC detector 306 may detect the SOC of each battery cell by detecting the voltage across the battery cell. The SOC detector 306 sends the detected SOC of each battery cell to the BMU 308. Based on the SOC of each battery cell, the BMU 308 checks whether each battery cell is over-charged and over-discharged or not, and manages SOC information of each battery cell. The BMU 308 outputs the SOC information of each battery cell to the ECU 86.

The contactor 300 connects to the main battery 18. The DC-to-DC converter 82 lowers the voltage of the battery module 304 that is supplied through the contactor 300, and applies the lowered voltage to the auxiliary battery 80, thereby charging the auxiliary battery 80. The DC-to-DC converter 82 also applies the lowered voltage to the ECU 86. The auxiliary battery 80 supplies its electric power to the BMU 308.

The ECU 86 controls various parts of the two-wheeled electric vehicle 10. Based on the SOC information sent from the BMU 308, the ECU 86 controls the discharging and charging of the battery module 304. The power drive unit 50 has a PWM inverter which converts a direct current from the battery module 304 into three-phase alternating currents to energize the electric motor 16 according to a control signal from the ECU 86.

The DC power supply 310 has a DC-to-DC converter which converts AC electric power from the commercial power supply outlet into DC electric power according to a control signal from the controller 311. The DC power supply 310 outputs the converted DC electric power to the contactor 300. The controller 311 controls the voltage and current output from the DC power supply 310 according to a control signal from the ECU 86.

When the battery module 304 is charged, the contactor 300 supplies electric power output from the DC power supply 310 to the battery module 304 according to a control signal from the ECU 86. When the SOC of the battery cells detected by the SOC detector 306 increases to a certain value, the contactor 300 disconnects the DC power supply 310 and the battery module 304 from each other, i.e., does not supply the electric power from the DC power supply 310 to the battery module 304, according to a control signal from the ECU 86.

When the two-wheeled electric vehicle 10 is running, the contactor 300 supplies the electric power from the battery module 304 to the power drive unit 50 to energize the electric motor 16 according to a control signal from the ECU 86. When the electric motor 16 produces regenerative energy, the contactor 300 charges the battery module 304 with the regenerative energy according to a control signal from the ECU 86.

In the first embodiment of the present invention, the two-wheeled electric vehicle 10 has been illustrated as a vehicle whose battery is charged by the electric charger 200. However, the principles of the present invention are not limited to an electric charger for charging the battery of a two-wheeled electric vehicle, but are applicable to an electric charger for charging the battery of any vehicle.

<2nd Embodiment>

Figure 9:
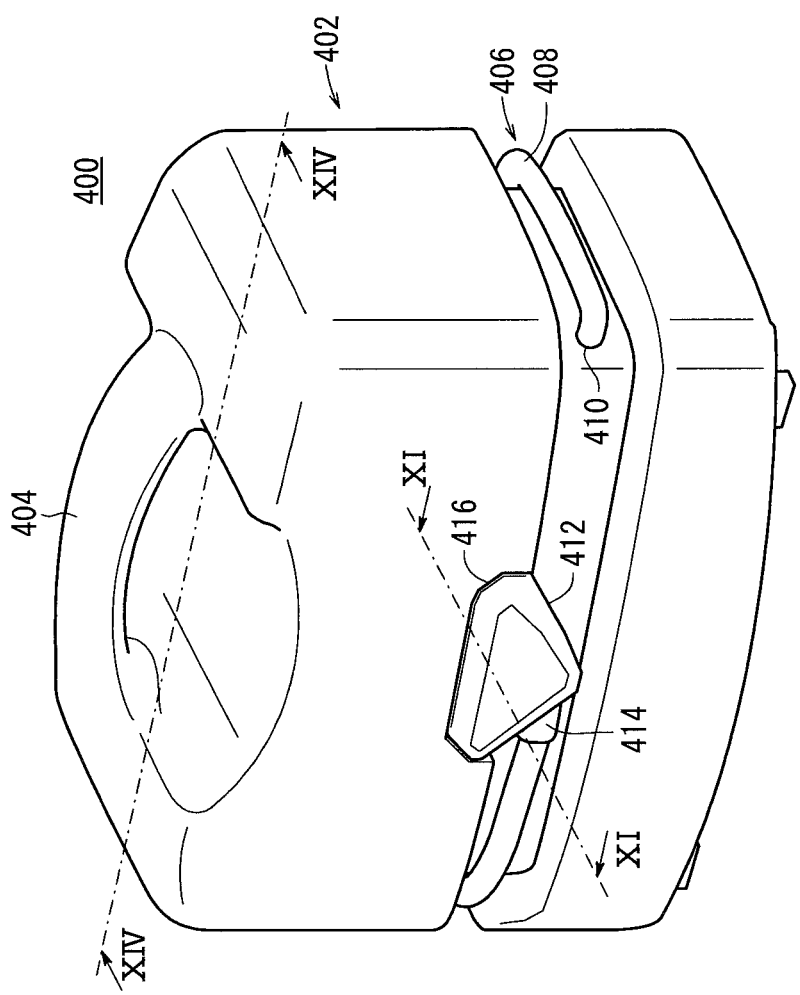
FIG. 9 is a perspective view of an electric charger 400
Figure 10:
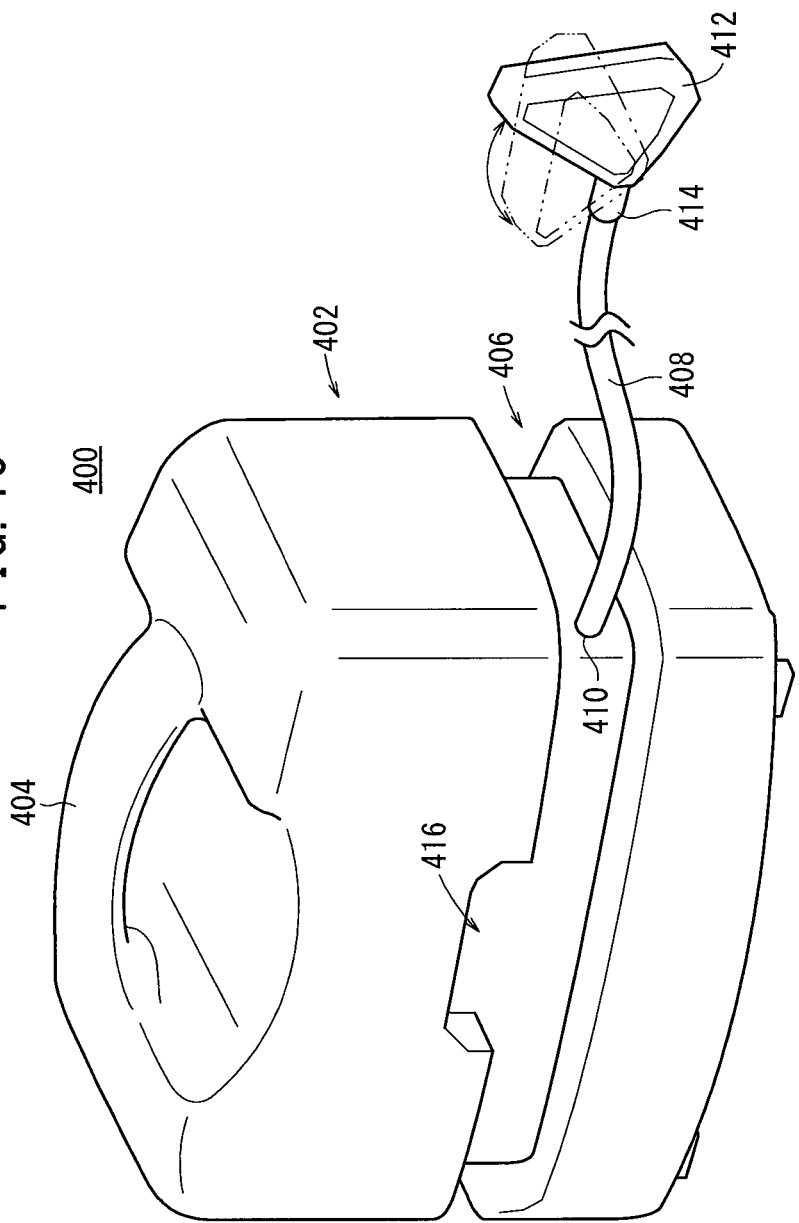
FIG. 10 is a perspective view of the electric charger 400 according to the second embodiment of the present invention.

FIGS. 9 and 10 are perspective views of an electric charger 400 according to a second embodiment of the present invention.

FIG. 9 shows the electric charger 400 with a first charging electric cord 408 and a plug 412 stored therein, and FIG. 10 shows the electric charger 400 with the first charging electric cord 408 and the plug 412 extended therefrom, i.e., not stored therein. The electric charger 400 has a storage case 402 housing a charger unit therein and a grip 404 on an upper end of the storage case 402. The first charging electric cord 408 has an end connected to the charger unit and an opposite distal end connected to the plug 412. The storage case 402 has a take-up recess 406 defined in an outer circumferential surface thereof, and the first charging electric cord 408 can be wound up in the take-up recess 406. The storage case 402 has a hole 410 defined in the bottom of the take-up recess 406, and the first charging electric cord 408 extends through the hole 410 out of the storage case 402. As the first charging electric cord 408 extends through the hole 410 defined in the recess 406, out of the storage case 402, the user can easily and neatly place the first charging electric cord 408 into the take-up recess 406 in a take-up manner.

The plug 412 is connected to the distal end of the first charging electric cord 408 through a support 414. The plug 412 can be connected to a connector of a vehicle, such as the charging connector 20 (see FIG. 5), which is connected to the main battery 18. The storage case 402 has a plug cavity 416 defined therein for storing the plug 412. The plug cavity 416 partly overlaps the take-up recess 406. The plug cavity 416 is disposed at a position corresponding to a position of the plug 412 at the time when neatly winding of the first charging electric cord 408 around the take-up recess 406 is finished.

Therefore, when the first charging electric cord 408 has been neatly wound up in the take-up recess 406 and the plug 412 is placed in the plug cavity 416, the first charging electric cord 408 does not slack. The first charging electric cord 408 can thus be nearly and compactly stored in the take-up recess 406. Also, as the plug 412 is housed in the plug cavity 416, the plug 412 does not interfere with other objects stored in a storage box, etc. in which the electric charger 400 is placed, when the user carries the storage box.

As indicated by the two-dot-and-dash lines in FIG. 10, the plug 412 is angularly movably supported on the support 414 by a hinge or a joint, not shown, for angular movement with respect to the first charging electric cord 408. Therefore, the plug 412 can be oriented freely with respect to the first charging electric cord 408 and hence can be conveniently placed in the plug cavity 416. The plug 412 that is angularly movable with respect to the first charging electric cord 408 can easily be connected to the connector of the vehicle. As shown in FIG. 9, the plug cavity 416 holds therein the plug 412 when it is oriented vertically toward the grip 404 in perpendicular to the longitudinal direction of the first charging electric cord 408.

Figure 11:
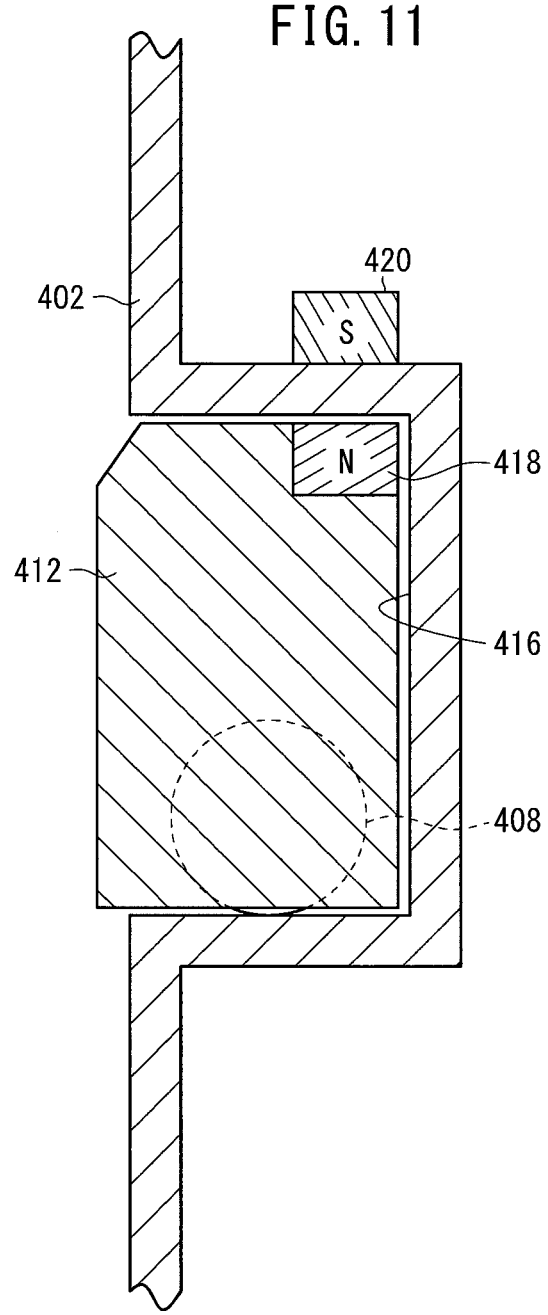
FIG. 11 is a fragmentary cross-sectional view taken along line XI-XI of FIG. 9.

FIG. 11 is an enlarged fragmentary cross-sectional view taken along line XI-XI of FIG. 9. As shown in FIG. 11, the plug 412 is received in the plug cavity 416. The plug 412 has a magnet 418 disposed therein and the storage case 402 has a magnet 420 disposed on a wall which partly defines the plug cavity 416. The magnets 418, 420 are positioned respectively in the plug 412 and the storage case 402 such that the magnets 418, 420 confront each other when the plug 412 is placed in the plug cavity 416. Either one of the magnets 418, 420 may be replaced with a magnetic metal member. For example, the plug 412 may have a magnetic metal member, and the storage case 402 may have the magnet 420. The magnets 418, 420 may be disposed in positions other than the positions illustrated in FIG. 11 insofar as the plug 412 is firmly fixed in the plug cavity 416 and is hard to separate away from the plug cavity 416 under magnetic attraction thereof.

Figure 12:
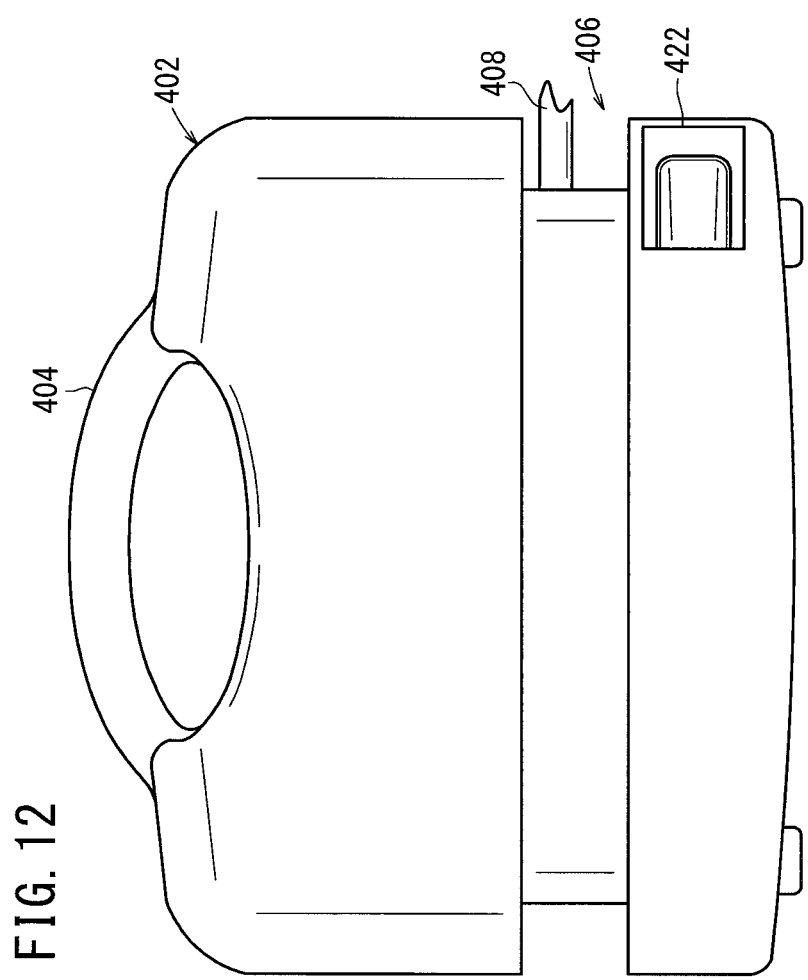
FIG. 12 is a rear elevational view of the electric charger 400 according to the second embodiment of the present invention.

FIG. 12 is a rear elevational view of the electric charger 400 according to the second embodiment of the present invention. The storage case 402 of the electric charger 400 has a hole defined therein below the take-up recess 406 for passage therethrough of a second charging electric cord (not shown) of AC 100 V, the hole being covered with a cap 422. The storage case 402 houses therein the second charging electric cord beneath the take-up recess 406. The second charging electric cord has a plug on its distal end for connection to a commercial power supply outlet. When the cap 422 is removed, the second charging electric cord with the plug can be pulled out of the storage case 402 through the hole.

Figure 13:
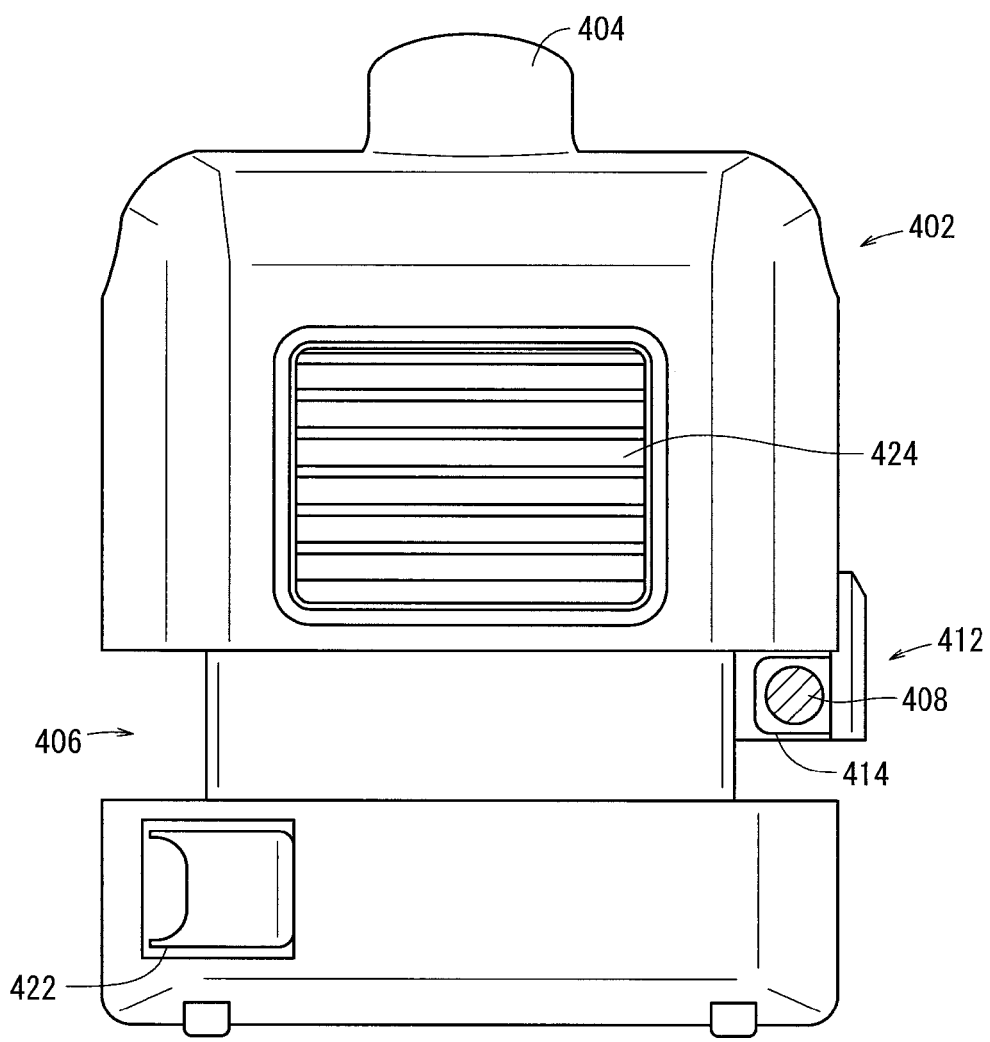
FIG. 13 is a side elevational view of the electric charger 400 according to the second embodiment of the present invention.

FIG. 13 is a side elevational view of the electric charger 400 according to the second embodiment of the present invention. As shown in FIG. 13, the electric charger 400 has a cooling fan for cooling the charger unit. The storage case 402 has an air outlet port 424 for discharging air from the cooling fan out of the storage case 402. The air outlet port 424 is defined in a left side wall of the electric charger 400 as shown in FIG. 9 and above the take-up recess 406.

FIG. 14 is a cross-sectional view taken along line XIV-XIV of FIG. 9. As shown in FIG. 14, the storage case 402 comprises the cooling fan, denoted by 428, and the charger unit, denoted by 434. The cooling fan 428 and the charger unit 434 are disposed above the take-up recess 406. The charger unit 434 may have a circuit board for controlling the cooling fan 428. The storage case 402 includes a spool 432 disposed in a storage space below the take-up recess 406, with the second charging electric cord, denoted by 430, wound around the spool 432 and disposed in the storage space. The storage case 402 may stores therein the second charging electric cord 430 in an automatic take-up manner.

As described above, the electric charger 400 according to the second embodiment includes the take-up recess 406 defined in an outer circumferential surface of the storage case 402 for winding the first charging electric cord 408 around the storage case 402 and the plug cavity 416 defined in the storage case 402 for storing therein the plug 412 connected to the distal end of the first charging electric cord 408. When the first charging electric cord 408 and the plug 412 are placed respectively in the take-up recess 406 and the plug cavity 416, the electric charger 400 has a neat and smart appearance and makes itself compact as the first charging electric cord 408 and the plug 412 are snugly received respectively in the take-up recess 406 and the plug cavity 416. As the plug 412 is housed in the plug cavity 416, the plug 412 does not interfere with other objects stored in a storage box (not shown) in which the electric charger 400 is placed when the user carries the storage box.

The electric charger 200 according to the first embodiment may be replaced with the electric charger 400 according to the second embodiment. In this case, an opening 436 which is defined by the storage case 402 and the grip 404 of the electric charger 400 may be regarded as the opening 202 of the electric charger 200 according to the first embodiment. In other words, the opening 436 may be hooked on the mount 96 of the two-wheeled electric vehicle 10. The electric charger 400 according to the second embodiment may have teeth corresponding to the teeth 205 on its bottom, and the teeth of the electric charger 400 may be fitted respectively in the recesses 96a defined in the step floor 12 of the two-wheeled electric vehicle 10, thereby installing the electric charger 400 on the two-wheeled electric vehicle 10.

Although certain preferred embodiments of the present invention have been shown and described in detail, it should be understood that various changes and modifications may be made therein without departing from the scope of the appended claims.

The invention claimed is:

1. A mounting structure for installing an electric charger on a vehicle including a battery, an electric motor for generating propulsive force to move the vehicle based on electric power supplied from the battery, and a vehicle frame cover which covers the vehicle, wherein the electric charger charges the battery and is separate from the vehicle, the mounting structure comprising:
   a mount disposed on the vehicle frame cover, for installing the electric charger on the vehicle,
   wherein the vehicle further includes a seat cover having a charging lid on a side surface of the vehicle, and a charging connector for charging the battery, the charging connector being disposed behind the charging lid; and
   the electric charger has an electric charging cord to be connected to the charging connector.

2. The mounting structure for installing an electric charger according to claim 1, wherein the mount is disposed on an upper portion of a leg shield.

3. The mounting structure for installing an electric charger according to claim 1, wherein the mount is disposed on a step floor.

4. The mounting structure for installing an electric charger according to claim 1, wherein the mount is disposed on a lower portion of the seat cover.

5. The mounting structure for installing an electric charger according to claim 1, wherein the electric charging cord is of such a length that the electric charging cord is kept out of contact with the ground, when the electric charger is installed on the mount.

6. The mounting structure for installing an electric charger according to claim 1, wherein the charging connector is oriented obliquely forwardly and outwardly as viewed from a front end of the vehicle.

7. The mounting structure for installing an electric charger according to claim 1, wherein the vehicle includes a side stand, and the charging connector is disposed on the same side of the vehicle as the side stand.

* * * * *